US008215365B2

(12) United States Patent
Bittner et al.

(10) Patent No.: US 8,215,365 B2

(45) Date of Patent: Jul. 10, 2012

(54) APPLIANCE FOR LABELLING RECEPTACLES

(75) Inventors: Willibald Bittner, Abendsberg-Offenstetten (DE); Martin Plank, Neutraubling (DE)

(73) Assignee: Krones AG (DE)

( * ) Notice: Subject to any disclaimer, the term of this patent is extended or adjusted under 35 U.S.C. 154(b) by 330 days.

(21) Appl. No.: 12/394,996

(22) Filed: Feb. 27, 2009

(65) Prior Publication Data

US 2009/0217628 A1 Sep. 3, 2009

(30) Foreign Application Priority Data

Mar. 3, 2008 (DE) ........................ 10 2008 012 209

(51) Int. Cl.

| | |
|---|---|
| ***B29C 65/48*** | (2006.01) |
| ***B32B 37/10*** | (2006.01) |
| ***B32B 39/00*** | (2006.01) |
| ***B65H 37/00*** | (2006.01) |
| ***B65C 9/18*** | (2006.01) |
| ***B65C 9/36*** | (2006.01) |
| ***B30B 5/00*** | (2006.01) |

(52) U.S. Cl. ........ 156/538; 156/240; 156/542; 156/555; 156/566; 156/567; 156/580; 156/583.3; 156/583.91; 156/DIG. 9; 156/DIG. 10; 156/DIG. 13; 156/DIG. 26; 156/DIG. 33; 156/DIG. 37; 156/DIG. 42

(58) Field of Classification Search .................. 156/247, 156/249, 289, 538, 540–542, 555, 566, 567, 156/580, 583.3, 583.91, DIG. 8, DIG. 9, 156/DIG. 10, DIG. 13, DIG. 26, DIG. 28, 156/DIG. 33, DIG. 37, DIG. 42; 53/136.1, 53/167, 281, 415, 426, 485

See application file for complete search history.

(56) References Cited

U.S. PATENT DOCUMENTS

| | | | | |
|---|---|---|---|---|
| 4,591,403 | A | 5/1986 | Von-Meyer | 156/364 |
| 6,493,896 | B1 * | 12/2002 | Stuchlik et al. | 15/49.1 |
| 2005/0138895 | A1 * | 6/2005 | Schach | 53/415 |

FOREIGN PATENT DOCUMENTS

| | | |
|---|---|---|
| DE | 1 014 922 | 8/1957 |
| DE | 103 57 329 | 7/2005 |
| GB | 2 431 911 | 5/2007 |

OTHER PUBLICATIONS

European Search Report, dated Jun. 25, 2009, (8 pgs).

Chinese Office Action issued on Appln. No. 2009101184410/Post No. 2011112900817640, dated Dec. 2, 2011 (14 pgs).

* cited by examiner

*Primary Examiner* — Sing P Chan

(74) *Attorney, Agent, or Firm* — Hayes Soloway P.C.

(57) ABSTRACT

Appliance for applying labels to receptacles, which comprises a transport device that transport the receptacles to be labeled along a predefined transport path, and comprises a first pressing-on unit that presses the labels onto an outer wall of the receptacles, the first pressing-on unit having a brush device having a multiplicity of bristles that extend in the direction of the receptacles. According to the invention, the first pressing-on unit, at least in a partial region of the first pressing-on unit, is shorter, in the longitudinal direction of the receptacles, than the label to be applied.

29 Claims, 4 Drawing Sheets

A
A
26
24

29
B-B
40

40
56
54
26
42
24
R
28
B
B
20
23
27

26
58
D
C
42
D
A-A
28
25
26

APPLIANCE FOR LABELLING RECEPTACLES

The present invention relates to an appliance for labelling receptacles. The practice of using fully automatic appliances for labelling receptacles has been known for a long time from the prior art. In such cases, these appliances apply labels to glass or plastic receptacles. Known in such cases is both the practice of spreading an adhesive layer onto label strips, in order then to apply these label strips to the receptacle, and the practice of using self-adhesive labels. It is furthermore known in such cases that such labels must first be arranged on the receptacle and then pressed onto the receptacle. Used for this purpose are pressing-on elements such as, for example, sponges, which press the label onto the circumferential wall of the receptacle from the outside.

DE 103 57 329 A1 describes a labelling machine having brush elements, i.e., in the case of this appliance, brushes are used instead of sponges, which brushes press the labels onto the receptacles. These brush elements have various advantages in comparison with sponges, since they can also more easily compensate irregularities of receptacles or on surfaces.

However, difficulties ensue in the application of the labels to the receptacles, owing, for example, to slightly differing receptacle diameters. Furthermore, in the case of the appliances known from the prior art there is quite often deformation of the label, which then results in obtrusive visual effects.

The present invention is therefore based on the object of creating an appliance for labelling receptacles that allows more accurate application of the labels to the receptacles. Furthermore, there is also to be created an appliance that adapts better to receptacle diameters that vary slightly relative to one another.

An appliance, according to the invention, for applying labels to receptacles has a transport device that transports the receptacles to be labelled along a predefined transport path. Furthermore provided is a first pressing-on unit, which presses the labels onto an outer wall of the receptacles, the first pressing-on unit having a brush device having a multiplicity of bristles that extend in the direction of the receptacles. According to the invention, the first pressing-on unit, at least in a partial region of the first pressing-on unit, is shorter, in the longitudinal direction of the receptacle, than the label to be applied.

Extending of the bristles in the direction of the receptacles is understood to mean that they extend at least also in the direction of the receptacles, but can also stand obliquely relative to the exact radial direction relative to the receptacles or the transport path. Preferably, the directions in which the multiplicity of bristles extend are distributed statistically around the radial direction of the receptacles or the transport path. The pressing-on unit is understood to mean that element which contacts the labels as the labels are being pressed onto the receptacles.

The transport device transports the receptacles to be labelled past the first pressing-on unit, which is arranged, advantageously, to be stationary. In this case, the first pressing-on unit is preferably arranged to be stationary, in particular, in the running process.

The pressing-on unit, or brush device, according to the invention initially applies the label to a receptacle, not along a total length, but in a region shortened relative thereto. In this way it is more easily possible for any slight slants to be compensated during the further application process without deformations of the label on the receptacle occurring as a result. It would also be possible for the pressing-on unit (in its entirety) to be realized as a conventional element, for example as a sponge, which is shorter in a partial region, in the longitudinal direction of the receptacles, than the label.

Preferably, therefore, the partial region, as viewed in the direction of transport of the receptacles, is arranged in the initial region of the pressing-on unit. This means that, preferably, the label is initially applied to the receptacle only in a partial region. Preferably, the pressing-on unit comprises the brush device in the said partial region.

This means that, in any case, a brush device is provided in the initial region in which the label is arranged on the receptacle. Preferably, the first pressing-on unit has a brush unit in the entire region of contact with the receptacle. This means that the entire pressing-on operation is performed by means of a brush unit. It also becomes possible, however, for the first pressing-on unit to be composed partly of a brush unit and partly of devices, such as sponges and the like, known from the prior art.

Preferably, the pressing-on unit, or the brush device, widens in the direction of transport of the receptacles. This means that the labels initially are pressed onto a receptacle only in a partial region of their extent, and are subsequently pressed-on along a greater region, and preferably completely.

Preferably the brush device widens linearly in the direction of transport of the receptacles. Consequently, in this case the first widening is effected rectilinearly and, in particular, without edges. In this manner, likewise, it is possible to counteract the formation of distortions of the label.

Preferably, the device has rotary devices, which rotate the receptacles about their longitudinal axis. In this way, a label can be glued onto the receptacles around their full circumference, or the label can be pressed completely onto the receptacle by the pressing-on unit.

Preferably, therefore, the brush device, at least in a partial region of the first pressing-on unit, in the longitudinal direction of the receptacles, is of at least the same length as the label to be applied.

In a further advantageous embodiment, in the above-mentioned partial region, the pressing-on unit, or the brush device, extends in a middle region of the label. This means that at least a middle region of the label is applied, and the upper and lower regions are initially not yet pressed onto the receptacle. A middle region in this case is understood to mean two middle quarters, preferably a middle third, and particularly preferably a middle fifth of the label.

In the case of a further advantageous embodiment, a second pressing-on unit is provided in addition to the first pressing-on unit, in the direction of transport of the receptacles, the second pressing-on unit being arranged, relative to the first pressing-on unit, on the other side of the transport path of the receptacles. This second pressing-on unit presses onto the receptacle, particularly preferably, in addition, that region of the label which has not yet been pressed-on by the first pressing-on unit, this being, in particular, the initial region of the label. Particularly preferably, both pressing-on units are provided in at least a partial region of the transport path, which pressing-on units simultaneously press the label onto the receptacle from two sides relative to the receptacle. In this partial region, the two pressing-on units are directly opposite one another relative to the transport path of the receptacles. In this way it is possible, particularly advantageously, for the initial region of the label also to be fixed completely to the receptacle. It would also be possible, however, for the first pressing-on unit and the second pressing-on unit to be offset partially or, also, completely in relation to one another along the transport path.

In a further advantageous embodiment, the first pressing-on unit is displaceable in relation to the transport path of the receptacles. In this way, tolerances of the receptacles in relation to one another can be more easily compensated. In particular, the first pressing-on unit is displaceable in a direction running transversally relative to the transport path. Preferably, the second pressing-on unit is also displaceable in relation to the transport path.

In a further advantageous embodiment, the transport path of the receptacles is realized, at least portionally, in the form of a segment of a circle, and the first pressing-on unit is arranged to be shiftable in a radial direction relative to this transport path. It is thereby possible to advance the first pressing-on unit in the radial direction of the transport path, and thereby to compensate slight tolerances of the receptacles in relation to one another.

In a further advantageous embodiment, the brush device, or the pressing-on unit, is detachably arranged on a carrier. In this way, rapid changing of the brush device is possible. Preferably, the carrier is curved and of rigid design. Preferably, the curvature of the carrier is matched to the curvature of the transport path.

In the case of a transport path advantageously in the form of a segment of a circle, the carrier thus also preferably has a circular curvature.

In a further advantageous embodiment, the appliance has a separating device, which separates a self-adhesive label from a carrier material. The separating device in this case is preferably arranged, in the direction of transport of the receptacles, before the pressing-on unit. This embodiment is directed, in particular, towards labelling appliances for so-termed self-adhesive labels, for which the embodiment having brush elements, according to the invention, is particularly suitable. In particular, self-adhesive labels can be applied to the receptacle in a particularly convenient manner by means of such brush devices.

The present invention is furthermore directed towards an appliance for applying labels to receptacles, which comprises a transport device that transports the receptacles to be labelled along a predefined transport path, and comprises a first pressing-on unit that is arranged to be stationary during the working operation and presses the labels onto an outer wall of the receptacles. According to the invention, in this case the first pressing-on unit is shiftable in a direction running transversally relative to the transport path.

This embodiment according to the invention makes it possible to compensate tolerances in respect of the diameter of the individual receptacles. This embodiment in this case is suitable both for the application of self-adhesive labels and for labelling appliances in which an adhesive layer is applied to labels.

It is also possible in this case for the pressing-on unit to be shiftable in a direction running obliquely relative to the transport path, it being essential, however, that the direction of shifting also has a component running transversally relative to the transport path. Preferably, the appliance is realized in the manner described above.

Preferably, the transport path runs, at least portionally, in the form of a segment of a circle, and the pressing-on unit can be shifted transversally relative to this region running in the form of a segment of a circle. Consequently, in this case the pressing-on unit is shifted, in particular, in a radial direction relative to the transport path.

In a further advantageous embodiment, the appliance has an indicating device that indicates a position of a pressing-on unit in relation to the transport path. In this way, it is very easily possible for the user to determine the exact position of the pressing-on unit in relation to the transport path, and to adjust it if appropriate.

Preferably, the appliance also has an adjusting device, by means of which the position of the pressing-on unit in relation to the transport path can be adjusted. For example, micrometer screws or the like can be used as such adjusting devices.

In a further advantageous embodiment, an articulated joint is arranged between the adjusting device and the pressing-on unit. By means of this articulated joint it is possible for the pressing-on unit to be adjusted exactly, since the joint between the adjusting device, which is preferably a rod-type element, and the pressing-on unit is not fixed exactly.

Preferably, in this case the adjusting device can be pivoted, at least slightly, in relation to the pressing-on unit, in the direction of the transport path.

In the case of a further advantageous embodiment, precisely two adjusting devices are provided for adjusting the pressing-on unit in relation to the transport path. In this way, the pressing-on unit can be displaced exactly to the wanted position in relation to the transport path.

The present invention is furthermore directed towards a method for applying labels to a receptacle. In this case, in a first method step, a label strip is supplied, this label strip having a multiplicity of labels arranged on a carrier material. In a further method step, the label is separated from the carrier material and, in a further method step, the label is supplied to the receptacle and pressed onto the receptacle by means of a first pressing-on unit.

According to the invention, the label, at least for a time, for only a moment, is pressed onto the receptacle in a longitudinal direction of the receptacle, along only a partial region of the label.

This means that, in this time portion, certain partial regions of the label are not pressed onto the receptacle. Preferably, a brush device having a multiplicity of bristles extending in the direction of the receptacles is used for pressing-on the labels.

Preferably the label, in an initial region, is pressed onto the receptacle only along a partial region. Particularly preferably, this is a middle partial region of the label. Through this method, as mentioned above, it is possible to prevent, or at least limit, the formation of distortions. Preferably, the labels are transported along a predefinable transport path.

Further advantages and embodiments are disclosed by the appended drawings, wherein.

Figure 1:
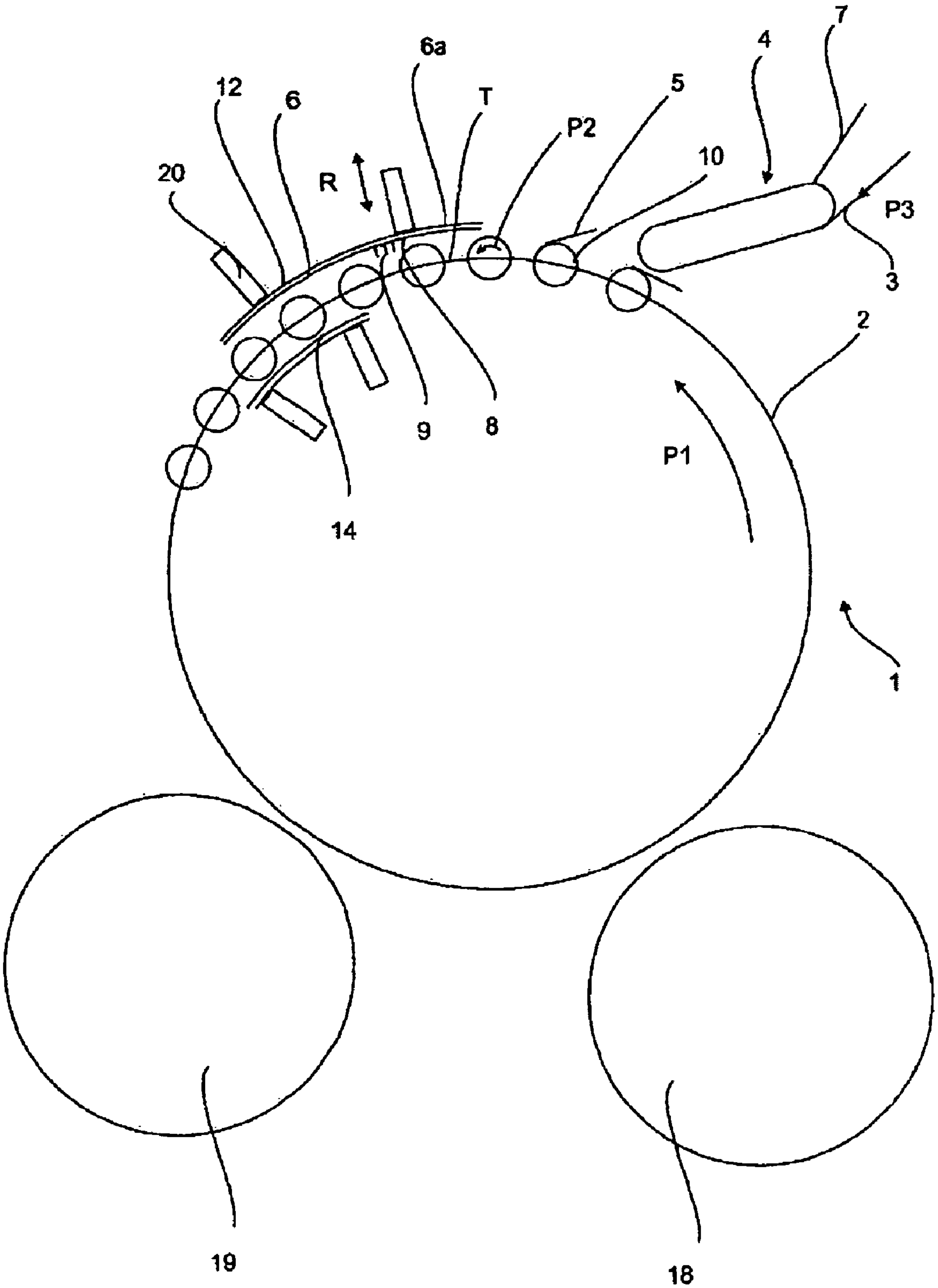
FIG. 1 shows a schematic view of an appliance according to the invention.

FIG. 1 shows an appliance 1, according to the invention, for labelling receptacles. This appliance has a transport device 2 (shown in schematic form only) in the form of a transport wheel, on which a multiplicity of receptacles 10 are transported along the arrow P1, i.e. counter-clockwise. Consequently, in this case the receptacles are guided along a circular path, or a circular transport path, which is denoted by the reference T. Labels are supplied to the receptacles 10 via a separating device, which is denoted in its totality by the reference 4. In this case, a label strip 3 is supplied to this separating device 4 along the arrow P3, and, in the front region of the separating device, labels 5 are removed from a carrier material 7 of the label strip 3 through sharp bending of this label strip 3. The carrier material 7 is then taken away. Furthermore, the separated labels 5 are arranged in a partial region on the receptacle 10.

The reference 6 denotes, in its totality, a pressing-on unit that presses the labels 5 onto the receptacles 10. For this purpose, the receptacles 10, as shown by the arrow P2, are likewise rotated counter-clockwise and at the same time guided, along their transport path T, past the stationary pressing-on unit 6. During this guiding-past, the pressing-on unit 6 contacts the labels 5 and thereby presses them onto the outer wall of the receptacles 10. The pressing-on unit 10 in this case has a brush element 8, which has a multiplicity of bristles 9 that extend in the direction of the receptacles, or in the direction of the transport path T. In this case, this pressing-on unit 6, or the brush element 8, is arranged on a carrier 12. The carrier 12, in turn, is displaceable in the direction R, i.e. transversally relative to the transport path T, by means of adjusting devices 20.

The reference 14 denotes a second pressing-on unit, which in this case is arranged radially within the transport path T and, for its part, presses the labels 5 onto the receptacle 10. In this case, in particular the initial region of the labels 5 can also be pressed onto the receptacles 10 by means of the second pressing-on unit 14, which initial region has not yet been pressed onto the receptacles 10 in the partial region 6*a*. The reference 18 denotes a supply wheel for supplying the receptacles to the transport device 2, and the reference 19 denotes a discharge wheel.

Figure 2:
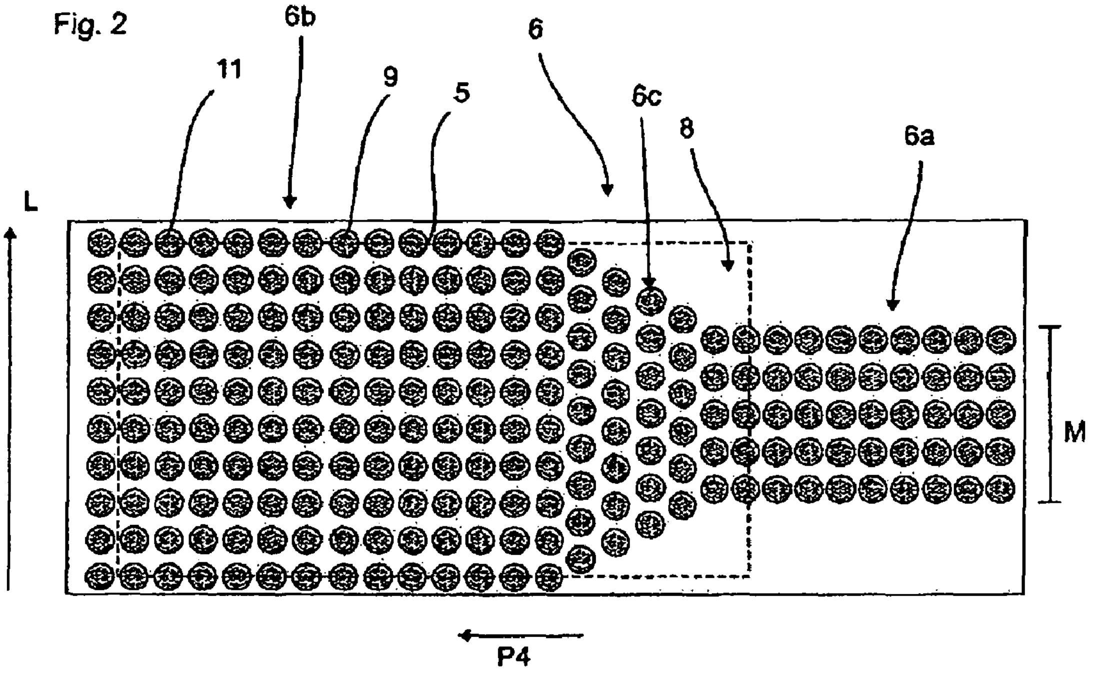
FIG. 2 shows a top view of a pressing-on unit in a first embodiment.

FIG. 2 shows a pressing-on unit 6, or a brush element 8, in a first embodiment. In this case, the brush unit 8 has a multiplicity of bristles 9, each arranged in bristle groups 11. In a first partial region 6*a* of the brush element 8, the brush element 8 in this case extends, in the longitudinal direction L of the receptacles, only in a partial region of a label 5, which is indicated here by a broken line, and consequently here the label is pressed onto the receptacle (not shown) only in this middle region M. In a transition region, the brush element widens in the longitudinal direction of the receptacles, to finally cover at least the full length of the label 5 in a second partial region 6*b*.

Figure 3:
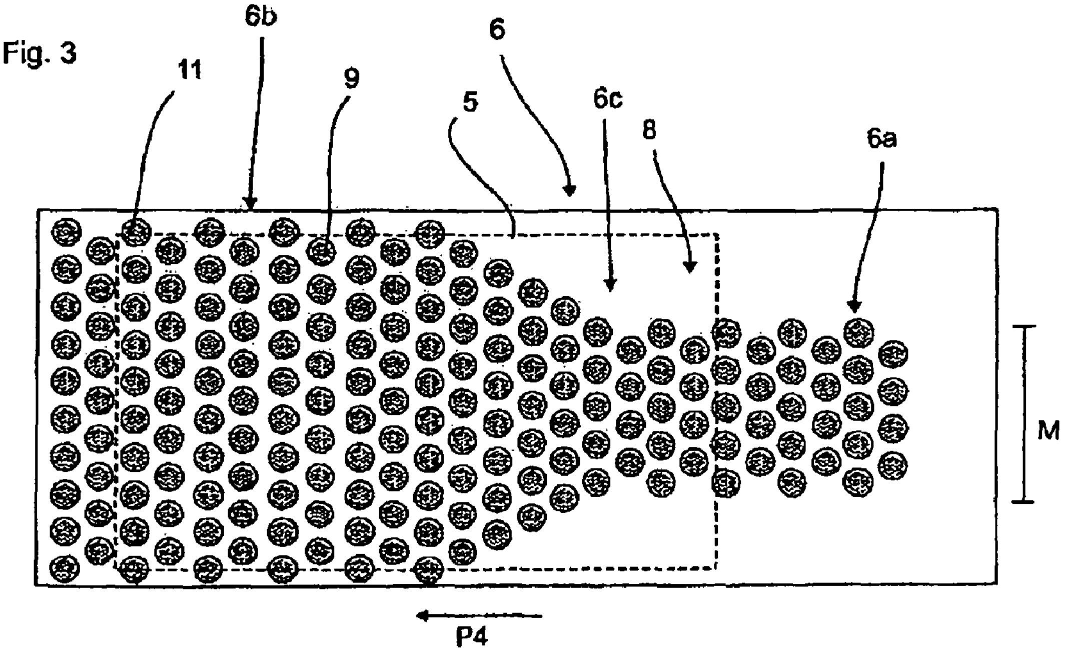
FIG. 3 shows a top view of a pressing-on unit in a further embodiment.

FIG. 3 shows a further embodiment of a brush device 8 according to the invention. In the case of this embodiment, the individual brush groups 11 are each offset in rows in relation to one another, since a closer structure of the brush groups 11 can be achieved in this manner. In this case also, however, the brush element preferably widens in the direction of transport of the receptacles, this direction, indicated by the arrow P4, being linear.

Figure 4:
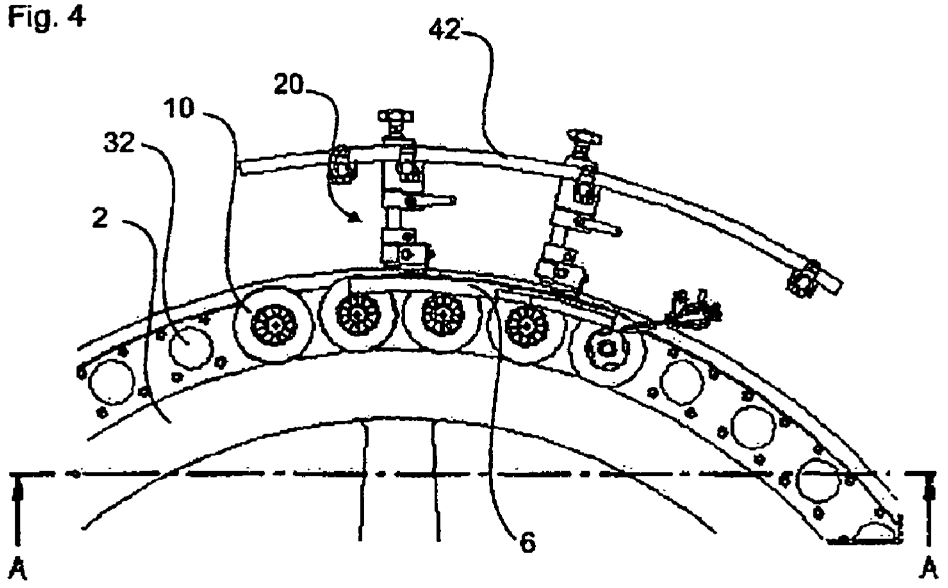
FIG. 4 shows a detailed view of an appliance according to the invention.

FIG. 4 shows a detailed view of an appliance according to the invention. Here, likewise, the separating device 4 and the pressing-on element 6 are shown. This pressing-on element 6 has a curved profile, the curvature being matched to the transport path T of the receptacles 10. The carrier 12 of the pressing-on element 6 is arranged, via two adjusting devices 20, on a curved carrier rod 42. Here, likewise, the reference 2 denotes the transport device 2 for transporting the receptacles 10. Arranged on this transport device 2 in this case is a multiplicity of rotary discs 32, by means of which the receptacles can be rotated about their longitudinal axis.

Figure 5:
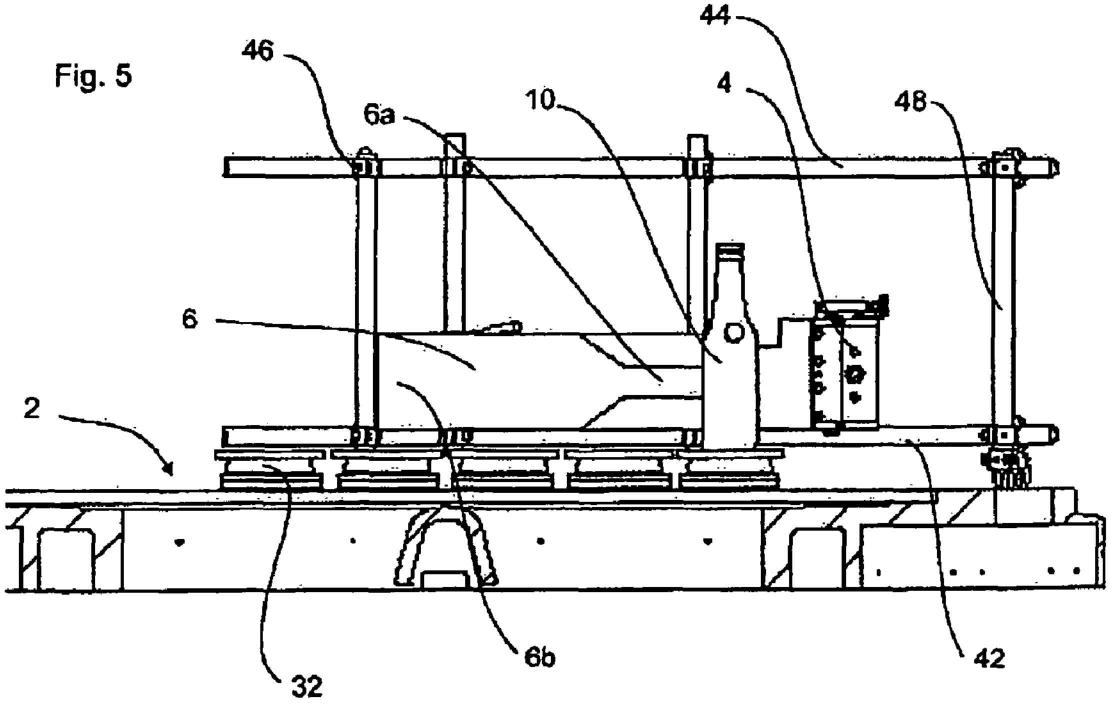
FIG. 5 shows a view of the detail from FIG. 4, along the line A-A from FIG. 4.

FIG. 5 shows a view of the detail from FIG. 4, along the line A-A in FIG. 4. It can be seen here that the pressing-on element 6, or the brush device 8, widens from an initial region 6*a* towards an end region 6*b*. The reference 48 denotes vertical rods, on which the carrier rod 42 is arranged so as to be displaceable in the longitudinal direction L of the receptacles 10. In this way, it is possible to shift the height of the pressing-on unit 6, or of the brush device 8, in relation to the receptacles 10. It would also be possible for a plurality of pressing-on units 6 to be arranged over one another in the longitudinal direction L, for example in order to arrange a plurality of labels over one another. The reference 44 denotes a further, curved rod, which serves to stabilize the individual vertical rods 48, and which is arranged on the curved rod 44 via connecting pieces 46.

Figures 6A, 6B, 6C, 6D:
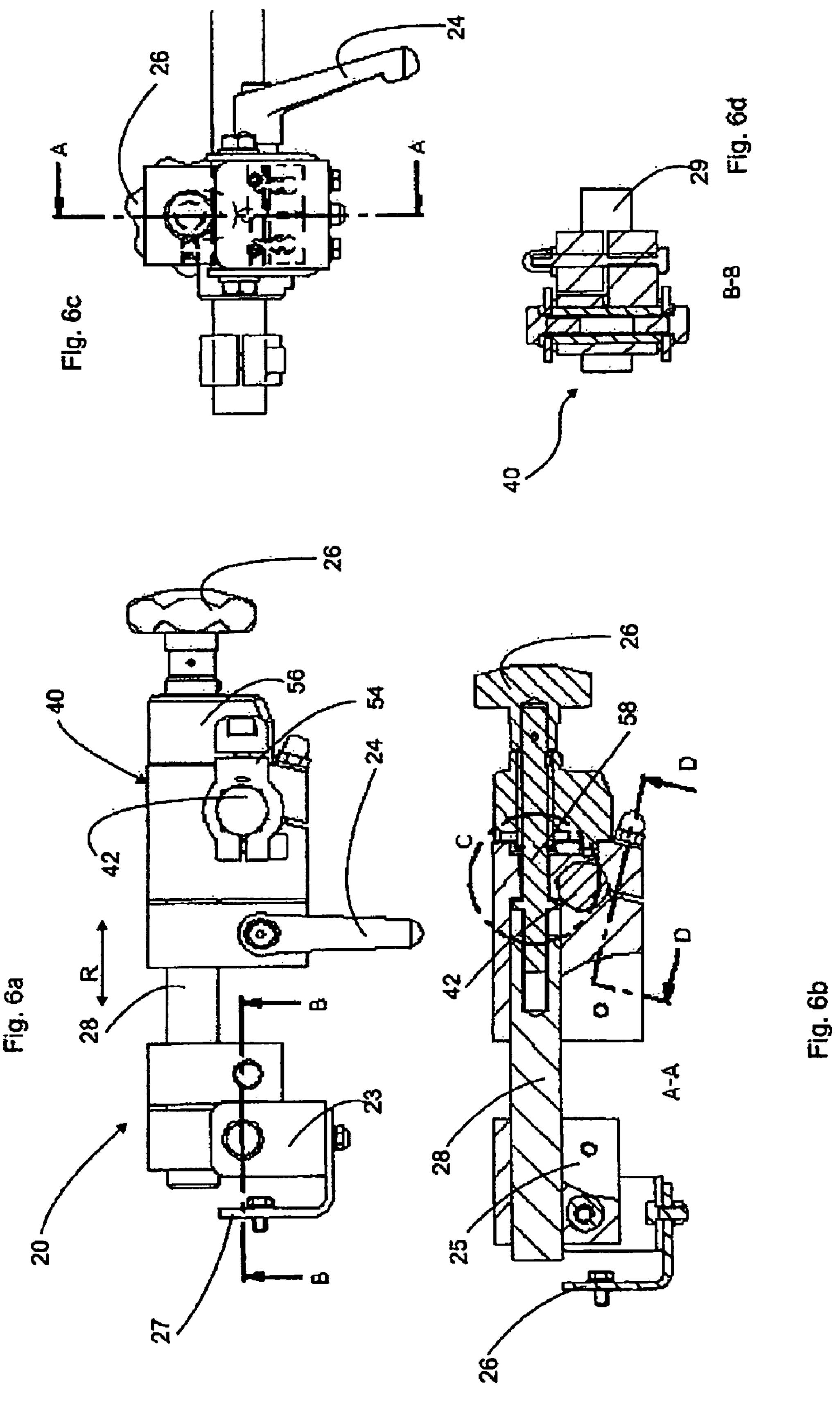
FIGS. 6*a*-6*d* show views of an adjusting device according to the invention.

FIGS. 6*a*-6*d* show differing views of the adjusting device 20. In FIG. 6*a*, the reference 23 denotes a holding device, on which there is arranged an angle piece 27 for fastening the pressing-on element (not shown). This holding device 23 is fastened to a bolt 28, the bolt 28 being adjustable in the direction R. The reference 24 denotes a lever for locking the position of the bolt 28.

The reference 42 again shows the carrier rod, on which there is arranged a holding element of the adjusting device 20, which holding element is denoted in its totality by the reference 40. In this case, a clamping piece 54 is provided to lock the holding element 40 in position. The position of the bolt 28 can be adjusted in the direction R by means of a rotatable grip 26. The reference 56 denotes an indicating device, by means of which the position of the bolt 28, and thus also of the pressing-on unit 6, can be read.

FIG. 6*b* shows a spindle 58, which extends partially inside the holding element 40 and which is arranged to be rotatable in the holding body 40. The bolt 28 is arranged on this spindle 58. FIG. 6*c* shows a further view of the adjusting device 20. Here, likewise, the rotatable grip 26 and the carrier rod 42 are shown. FIG. 6*d* shows a view of the adjusting device 20 from FIG. 6*a*, along the line B-B from FIG. 6*a*.

All features disclosed in the application documents are claimed as essential for the invention, insofar as they are novel, individually or in combination, as compared with the prior art.

The invention claimed is:

1. An appliance for applying labels to receptacles, which comprises a transport device that transports the receptacles to be labelled along a predefined transport path (T), and comprises a first pressing-on unit that presses the labels onto an outer wall of the receptacles, the first pressing-on unit having at least one brush device having a multiplicity of bristles that extend in the direction of the receptacles, wherein the first pressing-on unit, a first partial region of the first pressing-on unit, is shorter, in a longitudinal direction (L) of the receptacles, than the label to be applied, wherein the first partial region extends in direction of transport of the receptacles such that a region of the label is not pressed-on by the first pressing unit wherein a first partial region of the first pressing-on unit comprises a plurality of bristles tightly packed together in a generally rectangular shape wherein in a second partial region of the pressing-on unit covers at least the full length of the label wherein a first partial region of the first pressing-on unit comprises a plurality of bristles tightly packed together in a generally rectangular shape wherein between the first partial region and the second partial region the pressing-on unit widens in a transition region.

2. The appliance according to claim 1, wherein the partial region, as viewed in the direction of transport (T) of the receptacles, is an initial region of the pressing-on unit.

3. The appliance according to claim 2, wherein the pressing-on unit comprises the brush device in the partial region.

4. The appliance according to claim 1, wherein the first pressing-on unit has a brush device in the entire region of contact with the receptacle.

5. The appliance according to claim 1, wherein the brush device widens in the direction of transport (T) of the receptacles.

6. The appliance according to claim 5, wherein the brush device widens linearly in the direction of transport (T) of the receptacles.

7. The appliance according to claim 1, wherein the brush device, at least in a partial region of the first pressing-on unit, in the longitudinal direction (L) of the receptacles, is of at least the same length as the label to be applied.

8. The appliance according to claim 1, wherein in the partial region, the brush device extends in a middle region of the label.

9. The appliance according to claim 1, wherein a second pressing-on unit is provided in addition to the first pressing-on unit, the second pressing-on unit being arranged, relative to the first pressing-on unit, on the other side of the transport path (T) of the receptacles.

10. The appliance according to claim 9, wherein the second pressing-on unit serves to press onto the receptacles the region of the labels which has not yet been pressed onto the receptacles by the first pressing unit.

11. The appliance according to claim 1, wherein the first pressing-on unit is displaceable in relation to the transport path (T) of the receptacles.

12. The appliance according to claim 1, wherein the transport path (T) of the receptacles is realized, at least portionally, in the form of a segment of a circle, and the first pressing-on unit is arranged to be shiftable in a radial direction relative to said transport path (T).

13. The appliance according to claim 1, wherein the pressing-on unit is detachably arranged on a carrier.

14. The appliance according to claim 1, wherein the appliance has a separating device, which separates a self-adhesive label from a carrier material.

15. The appliance according to claim 1, wherein the appliance has an indicating device for indicating a position of a pressing-on unit in relation to the transport path (T).

16. The appliance according to claim 1, wherein the appliance has an adjusting device for adjusting the position of the pressing-on unit in relation to the transport path (T).

17. The appliance according to claim 1, wherein an articulated joint is arranged between the adjusting device and the pressing-on unit.

18. The appliance according to claim 1, wherein two adjusting devices are provided for adjusting the pressing-on unit in relation to the transport path (T).

19. The appliance according to claim 1, wherein the first partial region of the pressing-on unit is longer in the transport direction of the receptacles than the transition region.

20. The appliance according to claim 1, wherein in the first partial region at least four rows of bristles are arranged one behind the other in the direction of transport of the receptacles.

21. The appliance according to claim 1, wherein the length of the first partial region in the direction of transport of the receptacles is at least as long as a diameter of the receptacles.

22. The appliance according to claim 1, wherein the length of the first partial region in the direction of transport of the receptacles is at least as long as a circumference of the receptacles.

23. The appliance according to claim 1, wherein the first partial region of the pressing-on unit extends at least as long as a third part of the label.

24. An appliance for applying labels to receptacles, which comprises a transport device that transports the receptacles to be labelled along a predefined transport path (T), and comprises a first pressing-on unit that is arranged to be stationary during the working operation and presses the labels onto an outer wall of the receptacles, wherein the first pressing-on unit is shiftable in a direction running transversally relative to the transport path (T), wherein a brush device having a multiplicity of bristles extending in the direction of the receptacles is used for pressing-on the labels wherein a first partial region of the first pressing-on unit comprises a plurality of bristles tightly packed together in a generally rectangular shape, wherein in a second partial region of the pressing-on unit covers at least the full length of the label wherein between the first partial region and the second partial region the pressing-on unit widens in a transition region.

25. The appliance according to claim 3, wherein the transport path (T) runs, at least portionally, in the form of a segment of a circle, and the pressing-on unit is shiftable transversally.

26. The appliance according to claim 3, wherein the appliance has an indicating device for indicating a position of a pressing-on unit in relation to the transport path (T).

27. The appliance according to claim 3, wherein the appliance has an adjusting device for adjusting the position of the pressing-on unit in relation to the transport path (T).

28. The appliance according to claim 3, wherein an articulated joint is arranged between the adjusting device and the pressing-on unit.

29. The appliance according to claim 3, wherein two adjusting devices are provided for adjusting the pressing-on unit in relation to the transport path (T).

* * * * *